(12) United States Patent
Watanabe

(10) Patent No.: US 8,505,066 B2
(45) Date of Patent: Aug. 6, 2013

(54) SECURITY AUDIT SYSTEM AND METHOD

(75) Inventor: Atsushi Watanabe, Mississauga (CA)

(73) Assignees: Ricoh Company, Ltd., Tokyo (JP); Ricoh Americas Corporation, West Caldwell, NJ (US)

( * ) Notice: Subject to any disclaimer, the term of this patent is extended or adjusted under 35 U.S.C. 154(b) by 822 days.

(21) Appl. No.: 12/259,738

(22) Filed: Oct. 28, 2008

(65) Prior Publication Data

US 2010/0106958 A1 Apr. 29, 2010

(51) Int. Cl.
*H04L 9/00* (2006.01)
*G06F 7/04* (2006.01)

(52) U.S. Cl.
USPC ............. 726/1; 726/2; 726/3; 726/4; 726/5; 726/6; 713/1; 713/2

(58) Field of Classification Search
USPC .................................................. 726/1
See application file for complete search history.

(56) References Cited

U.S. PATENT DOCUMENTS

| | | | |
|---|---|---|---|
| 7,861,933 B2 * | 1/2011 | Zsigmond et al. | 235/462.01 |
| 2006/0112416 A1 * | 5/2006 | Ohta et al. | 726/1 |
| 2009/0088133 A1 * | 4/2009 | Orlassino | 455/411 |

* cited by examiner

*Primary Examiner* — Longbit Chai
(74) *Attorney, Agent, or Firm* — Cooper & Dunham LLP

(57) ABSTRACT

Methods, apparatuses and a system are provided for performing a security audit of, for example, a multi-function device.

20 Claims, 10 Drawing Sheets

Fig. 9A

| | |
|---|---|
| ver 1.0 | group 1 |

Device settings
| | |
|---|---|
| Paper Tray Setting Auto Detection (Tray 1) | 1 |
| Paper Tray Setting Auto Detection (Tray 2) | 0 |
| Paper Tray Setting Auto Detection (Tray 3) | 0 |
| Paper Tray Setting Auto Detection (Tray 4) | 0 |
| | |
| Paper Tray Setting Paper Size (Tray 1) | 4 |
| Paper Tray Setting Paper Size (Tray 2) | 2 |
| Paper Tray Setting Paper Size (Tray 3) | 4 |
| Paper Tray Setting Paper Size (Tray 4) | 4 |
| | |
| Output Tray (Copier) | 0 |
| Output Tray (Fax) | 0 |
| Output Tray (Printer) | 1 |
| | |
| 1 to 2 Sided Auto Margin T to T | 3000 |
| 1 to 2 Sided Auto Margin T to B | 3000 |

General Settings
| | |
|---|---|
| Device Name | device1 |
| Model Name | model 1 |
| Mashine Serial | 123456789 |
| | |
| Comment 1 | test |
| Comment 2 | test1 |
| Display Language | 1 |
| | |
| Day Light Saving Time | 1 |
| DST Start | 1 |
| DST End | 1 |
| Date and Time | 12345678 |
| Time Zone | 0 |

Fig. 9B

```
#Authentication Settings
User Authentication                             1
Administrator Authentication                    1

#Network Settings
telnet                                          0
ftp                                             0
snmp                                            0
snmp v3                                         1
smb                                             0

USB                                             0

Network Speed                          100m full

DNS 1                              192.168.***.***
DNS 2                              192.168.***.***
DNS 3                              192.168.***.***

Default Gateway                    192.168.***.***
Subnet Mask                        255.255.255.000
IP Address                         192.168.***.***
MAC Address                              123456789
```

SECURITY AUDIT SYSTEM AND METHOD

TECHNICAL FIELD

This application relates to security audit in information technology, and more particularly to a security audit system and method that can be used for multi-function devices.

BACKGROUND

In the current information age, it has often been discussed that proliferation of information technology (IT) can lead to a paperless society, as well as more convenience, efficiency, productivity, enjoyment, etc., in life. The extensive use and development of IT facilities in an enterprise (or other organization) environment, as well as in a home environment, have been accompanied by escalating accumulations of electronic data, as well as communications of such data from one person or organization to another person or organization, from one place to another place, etc. Notwithstanding such trends in practice, many people still rely on hardcopy documents for assorted reasons.

All of the above-mentioned factors (as well as others) contribute to the recent popularity of multi-function devices (MFP or MFD) which typically provide a user with assorted functionalities, such as scanning, copying, printing, document storage and retrieval, format conversion, facsimile, network and other communications, etc. MFDs allow users to convert information from paper (or other non-electronic) media to electronic media, and then communicate the electronic data via one or more communication media (for example, by scan-to-email, etc.) or store the data on one or more storage media (for example, by scan-to-FTP, scan-to-disk, etc.). Further, a MFD typically is configured to handle large quantities of paper and information at a high rate, in contrast to the typical standalone scanner.

The increasing use of MFDs, similar to use of many other IT tools that are accompanied by availability of large volumes of attendant electronic data, raises security concerns. The typical MFD is a kind of computer workstation including a CPU, memory, hard disk, application software running on an operating system, etc., and connected to a network environment. Therefore, a MFD, like other computers, can be susceptible to computer viruses, malicious activities and other security threats. Thus, advantages to a user from use of the MFD can be negated, at least at times and in part, by security concerns which can increase with escalating use.

There is a need to provide organizations and/or users who utilize a MFD with assurance that the data accompanying their use will not be corrupted and/or compromised by one or more security threats to or on the MFD.

SUMMARY

In an aspect of this disclosure, there is provided a security audit method, apparatus and system configured to perform a security audit of devices (such as a multi-function device), in an IT system. If the device fails the security audit, operation of the device can automatically be halted. The security audit can include, for example, comparing current device configuration setting of the device with a security audit policy (such as including, for example, one or more rules).

In another aspect of this disclosure, the security audit system and apparatus includes an update part for updating the device configuration setting of the device to acceptable settings, based on results of the above-mentioned comparison. After the device configuration setting of the device is updated, the updated device configuration setting can be compared to the security audit policy, and if a result of the comparison indicates the updated device configuration setting passes the security audit policy, the operation of the device is resumed.

In another aspect of this disclosure, there is provided means for obtaining data for updating the security audit policy. Such update data is validated and then utilized to update the security audit policy.

The appropriate update data or device configuration data can be obtained, for example, through a network connection or from a portable storage medium. In another example, the update part or means is external to the device and uploads the update data or device configuration data to the device to update the security audit policy or device configuration setting of the device. In another exemplary embodiment, the update part or means scans a document to obtain the update data or device configuration data.

BRIEF DESCRIPTION OF THE DRAWINGS

The features of the subject matter of this disclosure can be more readily understood from the following detailed description with reference to the accompanying drawings wherein:

FIGS. 9A and 9B show an example of a security audit policy, in accordance with an embodiment of the present application.

DETAILED DESCRIPTION

Figure 1:
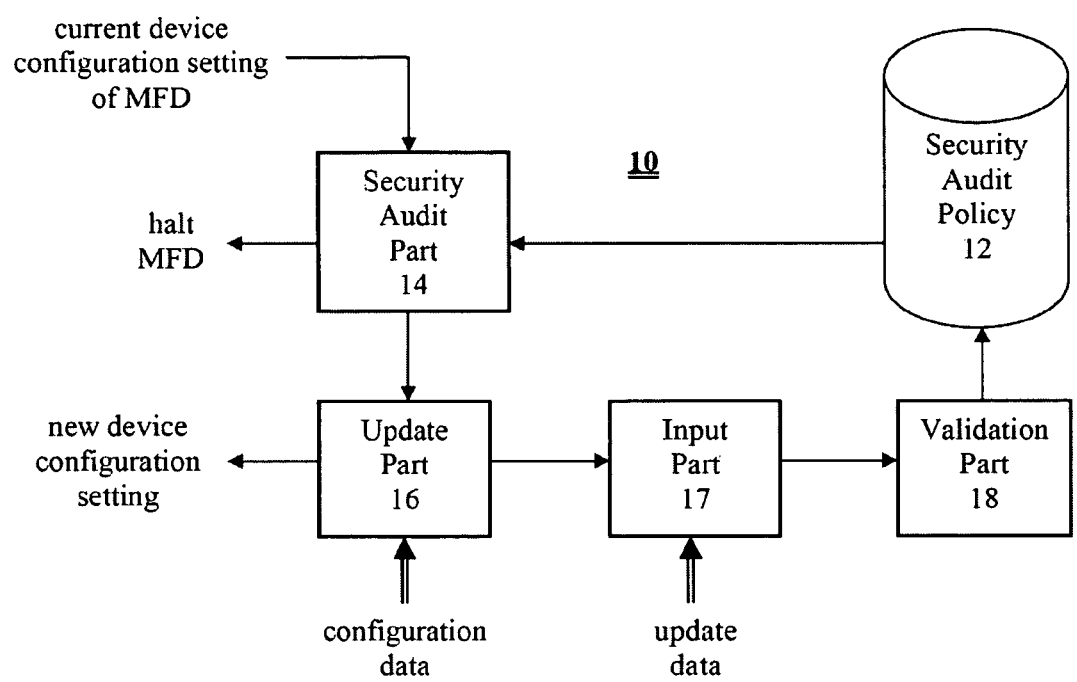
FIG. 1 shows a block diagram of an apparatus for performing a security audit, in accordance with an exemplary embodiment of this disclosure.

This application provides tools, in the form of system, apparatus and method, for performing a security audit.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner. In addition, a detailed description of known functions and configurations will be omitted when it may obscure the subject matter of the present invention.

Many organizations and/or users who utilize a of a multi-function device (MFD) in connection with processing of confidential or otherwise sensitive information prefer to limit access to certain functionalities of the MFD, such as scan-to-email, scan-to-FTP, etc., as well as network services, such as FTP (file transfer protocol), Telnet, etc. Such access restrictions as well as other security criteria can be controlled through configuration settings or firmware versioning. Typically, a configuration setting or firmware version is tested via selected security/network test criteria to determine whether a MFD with such configuration setting or firmware version is secure enough. If the device configuration setting or firmware version (referred to herein as "device configuration setting") passes the security/network test criteria, the configuration setting or firmware version is certified.

Once a device configuration setting is certified for a MFD, the system administrator keeps track of whether the MFD has a configuration setting and firmware version that has been certified. If the device is installed with a configuration setting or firmware version other than a certified device configuration setting, there might be a security concern and operation of the MFD may be halted in order to allow the device to be secured. In addition, the MFD may display a warning message on a display panel so that the user can see the status, and the MFD can notify IT administrator remotely.

An apparatus for performing a security audit of a multi-function device, in an exemplary embodiment, is shown in FIG. 1.

Apparatus 10 includes a storage part 12 configured to store a security audit policy, and a security audit part 14 configured to perform a security audit based on the security audit policy, including comparing current device configuration setting of the multi-function device with the security audit policy. If a result of the comparison by the security audit part 14 indicates failure of the security audit policy by the current device configuration setting of the multi-function device, operation of the multi-function device is halted. A warning message that the multi-function device failed the security audit policy can additionally (or alternatively) be displayed on a user interface of the multi-function device.

The security audit system preferably additionally includes an update part 16 configured to update the device configuration setting of the multi-function device based on the result of the comparison by the security audit part 14. For example, if the current device configuration setting of the multi-function device fails the security audit policy, the update part 16 can automatically obtain device configuration data through a network and update the device configuration setting of the multi-function device based on the device configuration data obtained through the network. After the device configuration setting of the multi-function device is updated by the update part, the updated device configuration setting is compared to the security audit policy, and if a result of the comparison indicates the updated device configuration setting passes the security audit policy, the operation of the multi-function device is resumed.

The update part 16 typically (but need not) reside on the MFD device. In a case that the update part resides on the multi-function device, device configuration data can be transferred from a portable storage medium to the MFD, and the update part updates the device configuration setting of the multi-function device based on the device configuration data obtained from the portable storage medium. In another example, the update part obtains device configuration data by scanning a hardcopy document, and updates the device configuration setting of the multi-function device based on the device configuration data obtained through said scanning of the document.

On the other hand, the update part can be external to the multi-function device, and in such case, the update part uploads device configuration data to the multi-function device and updates the device configuration setting of the multi-function device based on the uploaded device configuration data.

The security audit system preferably further includes an input part 17 configured to obtain update data for updating the security audit policy, and a data validation part 18 configured to validate the update data and update the security audit policy based on the update data.

The input part 17, in one example, obtains the update data for updating the security audit policy through a network. The input part can reside on the multi-function device and can obtain the update data for updating the security audit policy from a portable storage medium. In another example, the input part obtains the update data for updating the security audit policy by scanning a hardcopy document. On the other hand, the input part (like the update part) can be external to the multi-function device and can upload the update data for updating the security audit policy to the multi-function device.

The apparatus 10 may include one or more computer programs stored on a computer readable medium and/or transmitted via a computer network or other transmission medium. If a preferred embodiment, the apparatus resides natively on the multi-function device. Alternatively, the apparatus 10 can reside in whole or in part on a workstation or server computer connected to the multi-function device via a network or a dedicated line. Various exemplary embodiments and examples will be discussed below.

Figure 2:
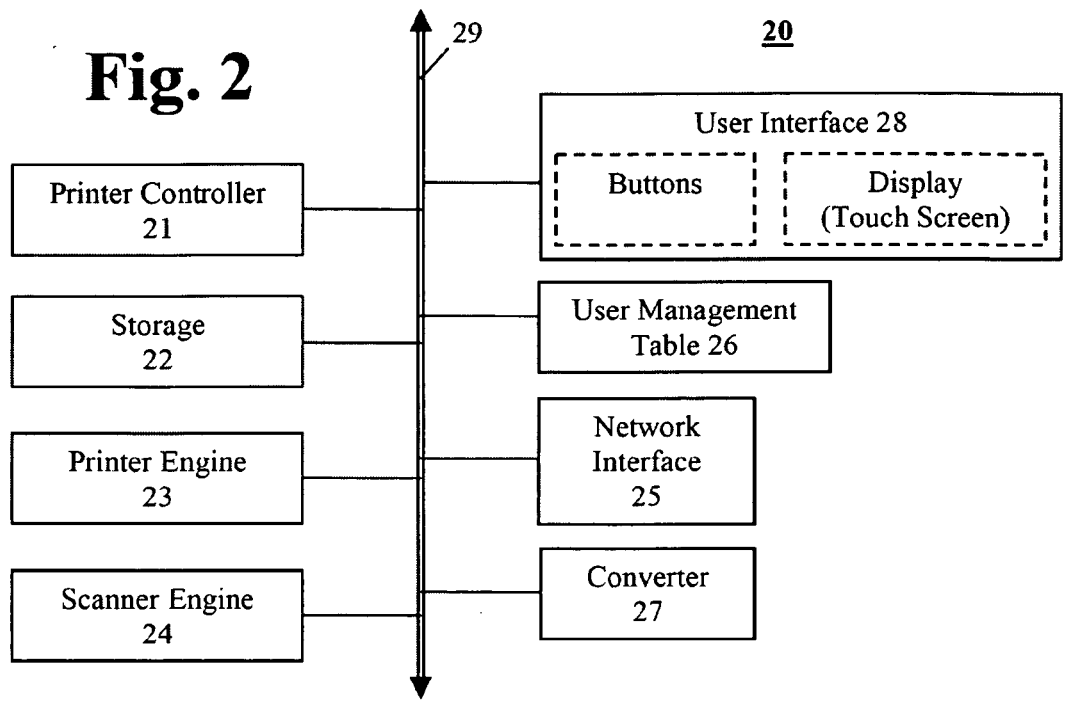
FIG. 2 shows a block diagram of a multi-function device, in accordance with an exemplary embodiment of this disclosure.

An example of a multi-function device (MFD) which includes functions that are present in conventional MFD devices, and additionally includes the functions and features described herein, is discussed below with reference to FIG. 2.

MFD apparatus 20 can include a controller 21, and various elements connected to the controller 21 by an internal bus 29. The controller 21 controls and monitors operations of the MFD 20. The elements connected to the controller 21 include storage 22 (for example, random access memory, read-only memory, hard disk drive, portable storage media drive such as for optical discs, magnetic discs, magneto-optical discs, etc., semiconductor memory cards, combinations of storage media, etc.), printer engine 23, scanner engine 24, network interface (I/F) 25, converter 27 for converting data from one format to another format (for example, a format suitable for printing, faxing, e-mailing, etc.), and user interface 28. The controller 21 also utilizes information stored in user management table 26 to authenticate the user and control user access to the functionalities of the MFD.

Storage 22 can include one or more storage parts or devices, and program code instructions can be stored in one or more parts or devices of storage 22 and executed by the controller 21 to carry out the instructions. Such instructions can include instructions for performing specified functions (such as printing, scanning, faxing, copying, e-mailing, etc.) of the MFD, to enable the MFD to interact with another terminal and/or computer, as well as perhaps other external devices, through the network interface 25, and to control the converter 27, access data in the user management table 26, and interactions with users through the user interface 28.

The user interface 28 includes one or more display screens that display, under control of controller 21, information allowing the user of the MFD 20 to interact with the MFD. The display screen can be any of various conventional displays (such as a liquid crystal display, a plasma display device, a cathode ray tube display, etc.), but preferably is equipped with a touch sensitive display (for example, liquid crystal display) and is configured to provide a GUI (graphical user interface) based on information input by an operator of the MFD, so as to allow the operator to interact conveniently with services provided on the MFD, or with the MFD serving as terminal for accessing electronic data or other content through the network. For example, a browser (such as Internet Explorer™, Netscape Navigator™, a proprietary browser, etc.) may be provided on the MFD so that the operator can use browsing operations to access documents or data in any of various databases or storage parts that are network-connected or in the MFD. As another example, the operator can scan a document, and use the browser to upload the image data from scanning of the document (and specify additional information associated with the image) to one of the databases or storage parts.

The display screen does not need to be integral with, or embedded in, a housing of the MFD, but may simply be coupled to the MFD by either a wire or a wireless connection. The user interface 28 may include keys and/or buttons (such as graphical keys or buttons, or other graphical elements, of a GUI on a touchscreen display) for inputting information or requesting various operations. Alternatively, the user interface 28 and the display screen may be operated by a keyboard, a mouse, a remote control, voice recognition, or eye-movement tracking, or a combination thereof.

Since the MFD 20 is typically shared by a number of users, and is typically stationed in a common area, the MFD preferably prompt the user to supply authentication information, such as user name (or other user or group information), password, access code, etc. The authentication information can be compared to data stored in the user management table 26 to confirm that the user is authorized to use the MFD. The authentication information may also be stored for the session and automatically supplied if access to other devices through the network requires it. On the other hand, such other devices may prompt the user to supply other authentication information through the user interface.

Another way for authenticating a user is for a user to swipe an access card through a card reader (not shown). Such access card can include user identification information, as well as account information to enable the management server to identify and authenticate the user, determine any credits remaining in the user (or group) account and allow such information to be displayed at the MFD upon request of the user.

Other methods of authentication may also be used. For example, the multi-function device may be equipped with one or more biometrics means (such as comparing fingerprints, palm prints, voice or speech, retinas or irises, facial expressions or features, signature, etc.).

Printer engine 23, scanner engine 24 and network interface 25 (similar to interface 23 in FIG. 2) are otherwise conventional, and therefore, a detailed description of such conventional aspects are omitted in the interest of clarity and brevity (so as not to mask the novel aspects of the subject matter of this disclosure). How the multi-function device can connect to and communicate over a network is well-known in the art and is discussed for example, in "How Networks Work", by Frank J. Derfler, Jr. and Les Freed (Que Corporation 2000) and "How Computers Work", by Ron White, (Que Corporation 1999), the entire contents of each of which are incorporated herein by reference.

The MFD 20 can have any or all of the functions of similar devices conventionally known, such as for scanning, editing and storing images, sending a fax, sending and receiving e-mails with or without attachments, accessing files by FTP or another protocol or facility, surfing the Web, etc.

Figure 3A:
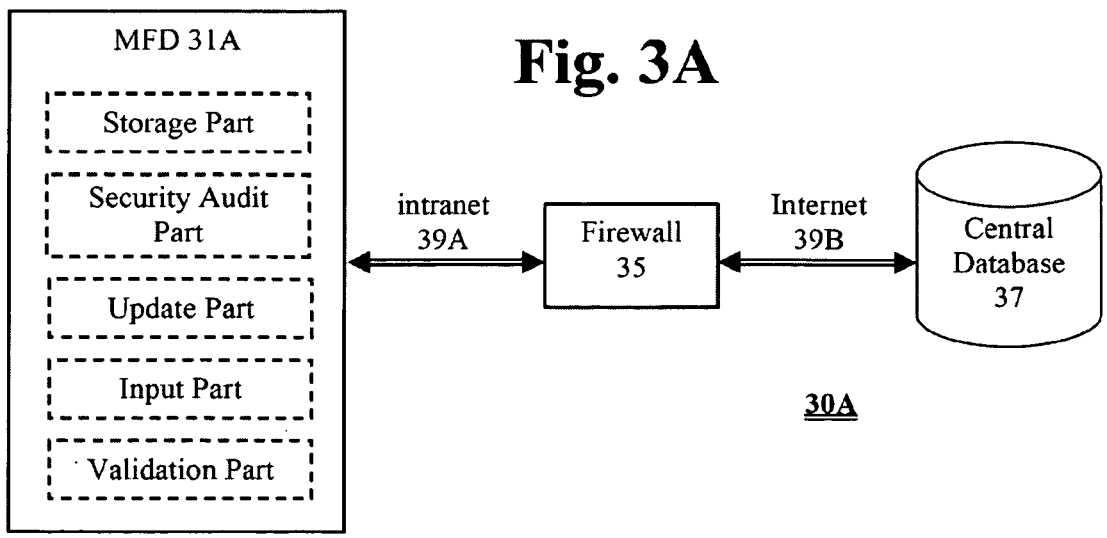
FIG. 3A shows a block diagram of a security audit system, in accordance with an exemplary embodiment of this disclosure.

In addition, the security audit part, update part, input part and validation part in the security audit apparatus can be implemented via software, in whole or in part, in the multi-function device (such as in MFD 31A in system 30A shown in FIG. 3A). In the exemplary embodiment shown in FIG. 3A, when a security audit of MFD 31A fails, the update part of MFD 31A communicates via networks 39A, 39B (and through firewall 35) with central database 37 to obtain appropriate device configuration data (such as firmware upload). The central database stores for each of assorted multi-function devices, the appropriately certified device configuration data and/or firmware specific to the device. Further, the central database stores for each multi-function device, security audit policy information, and the MFD 31A can likewise obtain a security audit policy update from the central database via networks 39A, 39B.

Accordingly, in the embodiment of FIG. 3A, the MFD 31A is self-checking and self-configuring, and when necessary, is able to obtain update data from a network-connected central database. While the exemplary embodiment shown in FIG. 3A shows the central database 37 as being outside of the firewall 35, it should be apparent to one skilled in the art that the multi-function device can also (or alternatively) obtain the update data from a database inside the firewall or within the intranet.

In another exemplary embodiment (FIG. 3C), the multi-function device obtains update data without utilizing a network connection. For example, in system 30C, MFD 31C is shown as a standalone multi-function device (although MFD 31C can be configured for a network connection, without such connection being utilized to obtain update data). A security audit apparatus (including security audit part, update part, input part and validation part) is native to MFD 31C, and update data is obtained by uploading from portable storage media (such as SD card, optical disk, etc.) and/or from scanning a hardcopy document (followed by OCR). Such approach may require user authentication, as well as perhaps an additional level of authentication (for example, of the data, media, etc.). In any event, such approach avoids communication of the update data through a network connection and therefore may be considered to be more secure.

Figure 3B:
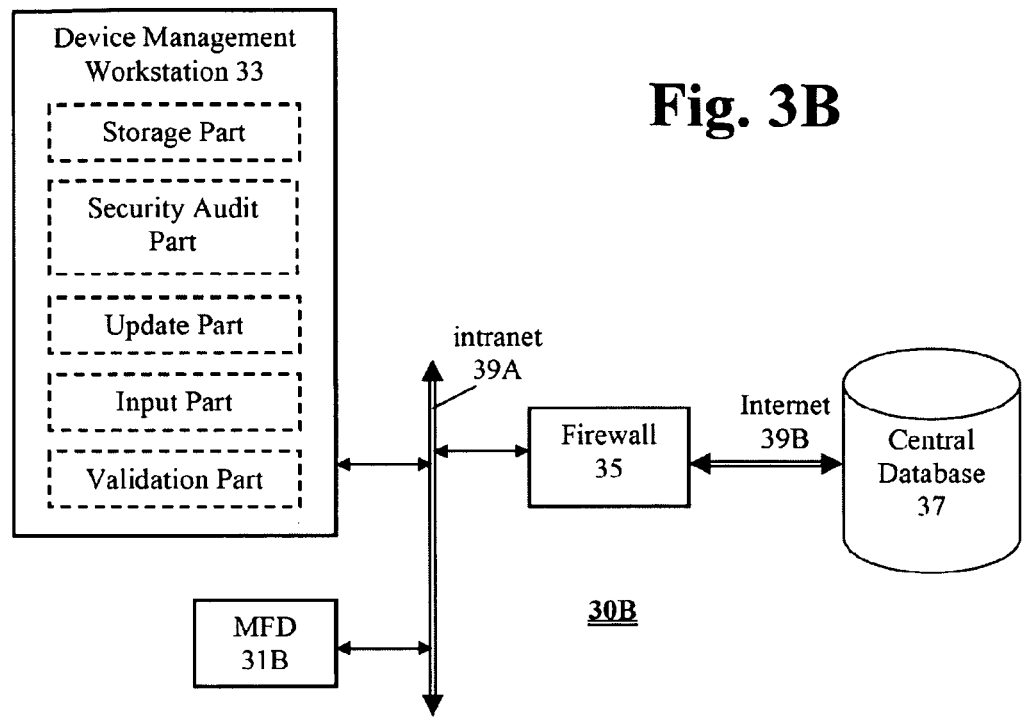
FIG. 3B shows a block diagram of a security audit system, in accordance with another exemplary embodiment of this disclosure.
Figure 3C:
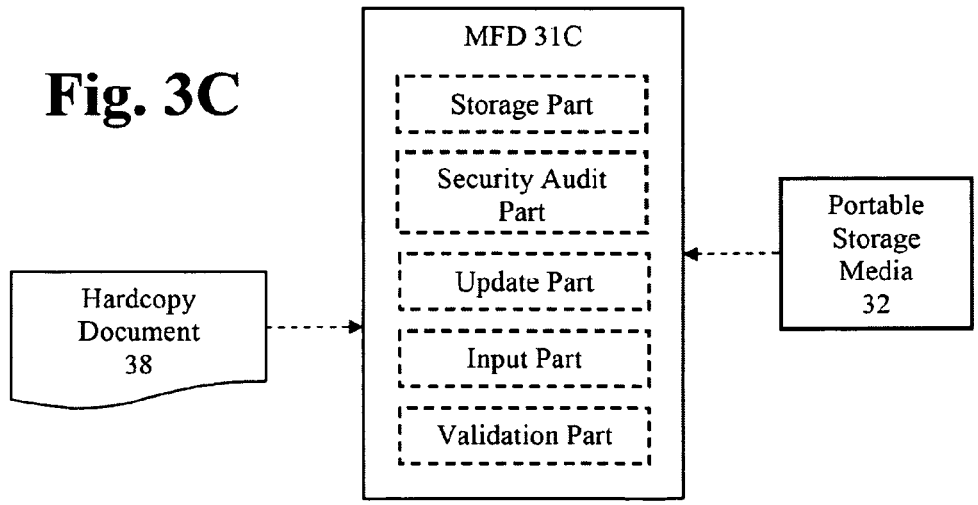
FIG. 3C shows a block diagram of a security audit system, in accordance with yet another exemplary embodiment of this disclosure.

On the other hand, all or a combination of the parts of the security audit apparatus may be maintained by a device management workstation and such parts maintained on the device management workstation may be executed remotely. For example, in another exemplary embodiment (FIG. 3B), the security audit part, update part, input part and validation part are all maintained on the device management workstation 33 which communicates with the MFD 31B to perform a security audit of the MFD 31B in system 30B. When a security audit of MFD 31B fails, the device management workstation 33 communicates via networks 39A, 39B (and through firewall 35) with central database 37 to obtain appropriate device configuration data (such as firmware), and then appropriately uploads the device configuration data (or firmware) to the MFD 31B to update the MFD 31. While the exemplary embodiment shown in FIG. 3B shows the device management workstation 33 as being inside of the firewall 35, it should be apparent to one skilled in the art that the device management workstation 33 can alternatively be network-connected (for example, as a server) outside the firewall. Further, in another exemplary embodiment, the device management workstation or server may be in charge of maintaining the central database, in addition to providing a security audit service.

Figure 4:
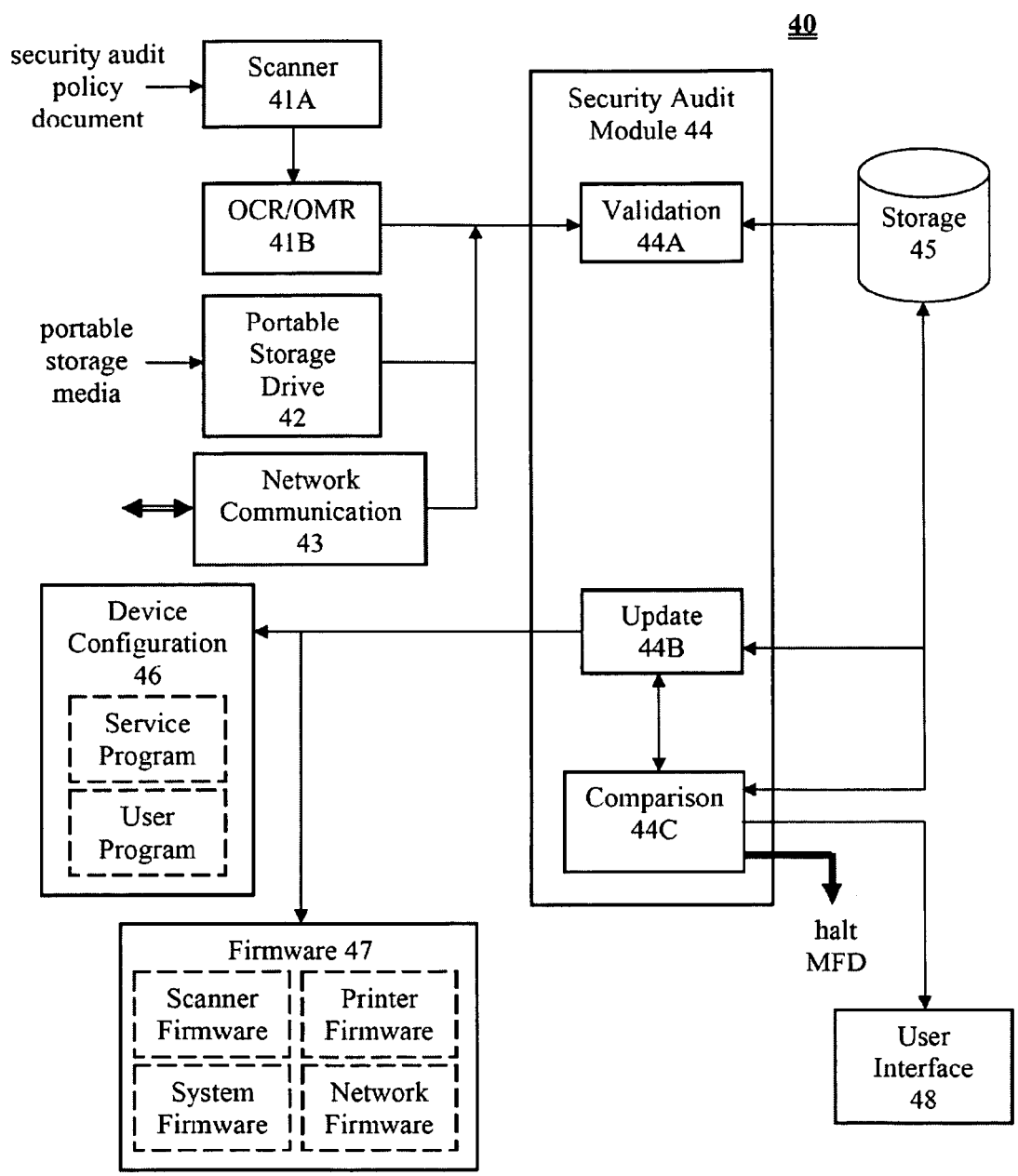
FIG. 4 shows a block diagram of a multi-function device configured to perform a security audit, in accordance with another exemplary embodiment of this disclosure.

A schematic view of parts of a MFD 40 configured for performing a security audit is shown in FIG. 4. The MFD 40 includes scanner 41A, OCR/OMR part 41B (for performing optical character recognition and/or optical mark recognition), portable storage drive 42, network communication 43, security audit module 44 including validation, update and comparison parts 44A-44C, storage 45, device configuration 46, firmware 47 and user interface. Additional components of the MFD 40 which are conventional are not shown in FIG. 4 and a detailed description of such conventional aspects are omitted in the interest of clarity and brevity.

The comparison part 44C of the security audit module 44 is configured to perform a security audit of the multi-function device. If and when the security audit fails, a warning message is displayed through the user interface 48 to alert the user that the security audit of the MFD failed and that operation of the MFD will be halted. Concurrently, a message to such effect may also be transmitted by e-mail and/or other communication mode to a system administrator.

Figure 5:
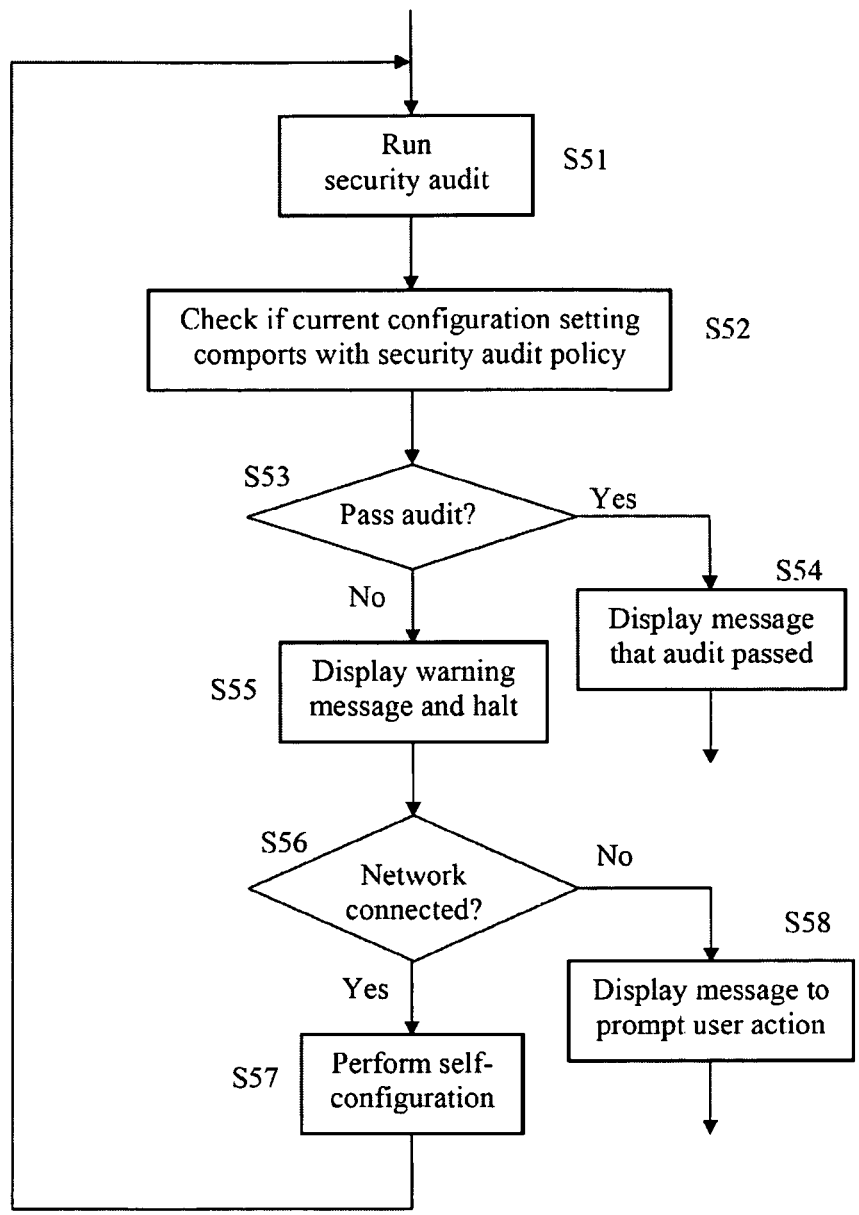
FIG. 5 shows a flow chart of a method for performing a security audit, in accordance with an embodiment of the present application.

A method executed by the MFD 40, in an exemplary embodiment of this disclosure, to perform a security audit is explained below with reference to FIG. 5. In such exemplary embodiment, security audit mode is typically enabled for self-checking on the MFD, and each time the MFD 40 is turned on, the comparison module 44C starts running automatically before booting up any MFD applications, such as copy, print, scan, fax, etc. (step S51). The comparison module 44C compares the configuration settings to the security audit policy (step S52). If the configuration settings comport matches the security audit policy (step S53, Yes), a message is displayed via the user interface to indicate that the MFD passed the security audit and then the process returns to the MFD applications (step S54).

On the other hand, if the configuration settings do not comport with the security audit policy (for example, firmware version is out-dated or otherwise not acceptable), a warning message is displayed indicating the MFD did not pass the security audit and operations are halted (step S55). If the MFD is connected to the network, self-configuration (update for device configuration setting or firmware) is automatically started (step S57), such as update by device management utility or from central database, and after self-configuration is completed, the system returns to step S51. If the MFD is not connected to the network, a message displayed via the user interface to prompt action for updating configurations settings (such as by inserting portable storage media or scanning hardcopy document and performing OCR).

As discussed above, the MFD may be self-configuring and in such case will proceed to automatically obtain update data, such as through network communication 43 and/or portable storage drive 42, and the update part 44B will utilize the update data to update device configuration 46 (including, for example, for system/service programs, user programs, etc.) and/or firmware 47 (such as system firmware, scanner firmware, printer firmware, network firmware, etc.). The update data is preferably authenticated and/or validated by validation part 44A, so as not to introduce bugs and/or security threats into the system, and then is stored in storage 45.

Figure 6:
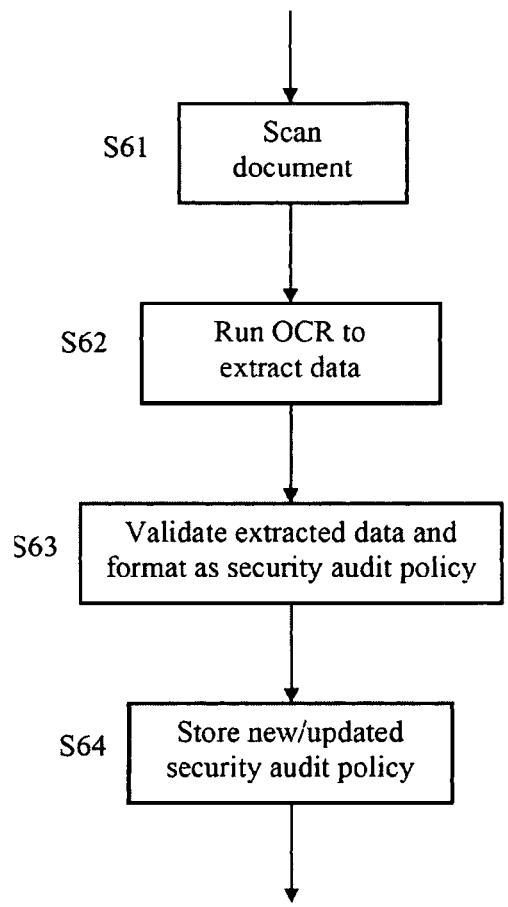
FIG. 6 shows a flow chart of a method for updating a security audit, in accordance with an embodiment of the present application.

In some instances, the security audit policy will need to be updated. In one approach for obtaining the update data from a hardcopy document bearing the updated security audit policy (FIG. 6), the hardcopy document is scanned and processed through the scanner module 41A (step S61), and followed by optical character recognition and/or optical mark recognition with OCR/OMR module 41B (step S62). The update data is preferably validated by the validation part 44A to ensure that it has not been tampered with (step S63). In the case of the a hardcopy document, the validation information may be encoded via a bar code, and an OMR operation is performed concurrently with the OCR operation. The updated security audit policy is stored in storage 45 (step S64), and later retrieved for use in subsequent security audits.

Figure 7:
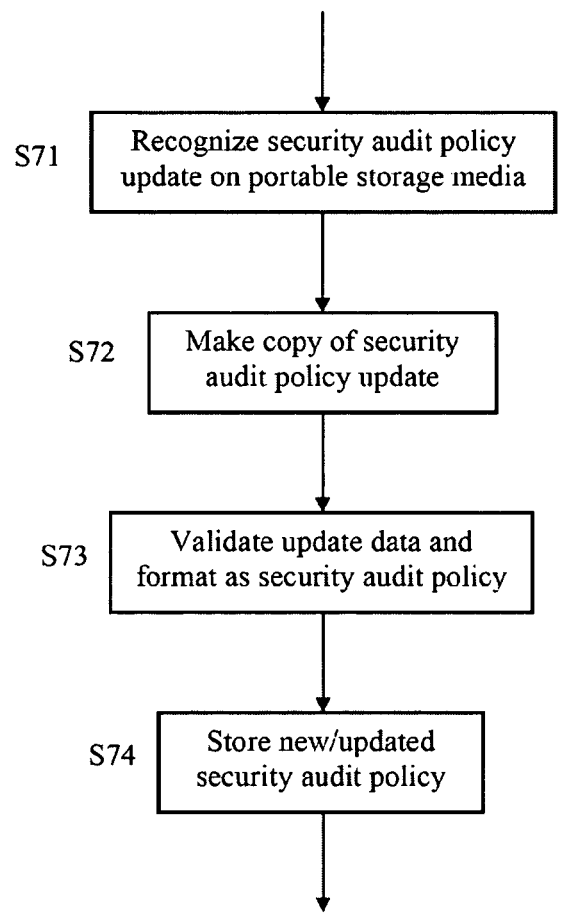
FIG. 7 shows a flow chart of a method for updating a security audit, in accordance with another embodiment of the present application.

In another approach for obtaining the update data, via portable storage media (FIG. 7), when the portable storage media is inserted in the drive 42 of the MFD, the MFD scans the content of the media and automatically recognizes that the portable storage media contains the security audit policy update (step S71). In such case, the MFD makes a copy of the update data/file (step S72) and the validation part 44A proceeds to perform a validation process and assuming that the update data is validated, format an updated security audit policy (step S73). The updated security audit policy is stored in storage 45 (step S74), for later use.

Figure 8:
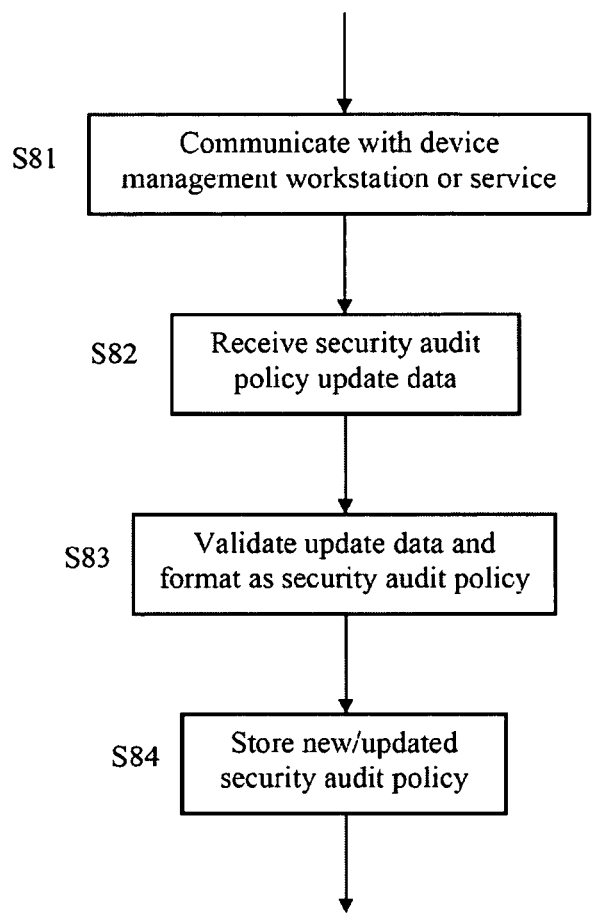
FIG. 8 shows a flow chart of a method for updating a security audit, in accordance with yet another embodiment of the present application.

In yet another approach for obtaining the update data, via the network (FIG. 8), the MFD communicates with a device management utility or workstation or service or with a central database (step S81). After communication has been established, the security audit policy data is transferred, such as by file transfer, to the MFD through network communication part 43 (step S82). The validation part 44A performs validation and utilizes the update data to format an updated security audit policy (step S83). The updated security audit policy is stored in storage 45 (step S84), for later use.

An example of a security audit policy is shown in FIGS. 9A and 9B.

It should be appreciated that the term "device configuration setting" is used in its broadest sense in this disclosure to include any settings of a device that affect operation of the device.

Thus, in the example of FIGS. 9A and 9B, the security audit policy specify the expected values of various device settings, general settings, authentication settings, network settings, etc. It should be appreciated that such settings are merely exemplary and that other settings can be included in the security audit policy.

The above specific exemplary embodiments and examples are illustrative, and many variations can be introduced on these embodiments and examples without departing from the spirit of the disclosure or from the scope of the appended claims.

For example, the security audit approach of this disclosure is described above in an exemplary context of a multi-function device. However, it should be appreciated that such an approach can be applied to other IT assets as well.

As another example, elements and/or features of different examples and illustrative embodiments may be combined with each other and/or substituted for each other within the scope of this disclosure and appended claims.

What is claimed is:

1. A security audit system for a multi-function device, said security audit system comprising:

a storage part configured to store a security audit policy;

a security audit part configured to perform a security audit based on the security audit policy, said security audit including comparing (i) a current device configuration setting of said multi-function device corresponding to current operating settings of the device with (ii) said security audit policy; and an update part configured to update the device configuration setting of the multi-function device and thereby change the current operating settings of the device, based on the result of the comparison by said security audit part, wherein in a case that a result of the comparison by the security audit part indicates failure of the security audit policy by the current device configuration setting of the multi-function device, the security audit part automatically halts operation of said multi-function device, and the update part automatically obtains device configuration data from external to the multi-function device to update the device configuration setting of the multi-function device and subsequently resumes the operation of said multi-function device under the updated device configuration setting after successful comparison with said security audit policy.

2. The security audit system as claimed in claim 1, wherein if the current device configuration setting of the multi-function device fails the security audit policy, said update part automatically obtains device configuration data through a network and updates the device configuration setting of the multi-function device based on the device configuration data obtained through the network.

3. The security audit system as claimed in claim 1, wherein said update part resides on said multi-function device, device configuration data is transferred from a portable storage medium to said multi-function device, and said update part updates the device configuration setting of the multi-function device based on the device configuration data obtained from the portable storage medium.

4. The security audit system as claimed in claim 1, wherein said update part is external to said multi-function device, uploads device configuration data to said multi-function device, and updates the device configuration setting of the multi-function device based on the uploaded device configuration data.

5. The security audit system as claimed in claim 1, wherein said update part obtains device configuration data by scanning a hardcopy document, and updates the device configuration setting of the multi-function device based on the device configuration data obtained through said scanning.

6. The security audit system as claimed in claim 1, wherein after said device configuration setting of the multi-function device is updated by said update part, the updated device configuration setting is compared to said security audit policy, and if a result of the comparison indicates the updated device configuration setting passes said security audit policy, the operation of said multi-function device is resumed.

7. The security audit system as claimed in claim 1, wherein if the current device configuration setting of the multi-function device fails the security audit policy, a warning message that the multi-function device failed the security audit policy is displayed on a user interface of the multi-function device.

8. The security audit system as claimed in claim 1, further comprising:
an input part configured to obtain update data for updating said security audit policy; and a data validation part configured to validate said update data and update said security audit policy based on said update data.

9. The security audit system as claimed in claim 8, wherein said input part obtains said update data for updating said security audit policy through a network.

10. The security audit system as claimed in claim 8, wherein said input part resides on said multi-function device, and obtains said update data for updating said security audit policy from a portable storage medium.

11. The security audit system as claimed in claim 8, wherein said input part is external to said multi-function device, and uploads said update data for updating said security audit policy to said multi-function device.

12. The security audit system as claimed in claim 8, wherein said input part obtains said update data for updating said security audit policy by scanning a hardcopy document.

13. The security audit system as claimed in claim 1, wherein the update part updates the device configuration setting of the multi-function device, and thereby changes the current operating settings of the multi-function device, by obtaining any one of an updated system program and updated firmware version corresponding to the multi-function device via a network, and installs said any one of the updated system program and the updated firmware version on the multi-function device.

14. A method for performing a security audit of a multi-function device, said method comprising the steps of:
(a) storing a security audit policy;
(b) comparing (i) a current device configuration setting of said multi-function device corresponding to current operating settings of the device with (ii) the security audit policy stored in (a);
(c) in a case that a result of the comparison in (b) indicates failure of the security audit policy by the current device configuration setting of the multi-function device, automatically halting operation of said multi-function device, and automatically obtaining device configuration data from external to the multi-function device to update the device configuration setting of the multi-function device and subsequently resuming the operation of said multi-function device under the updated device configuration setting after successful comparison with said security audit policy.

15. The method as claimed in claim 14, further comprising:
(a) obtaining device configuration data by scanning a hardcopy document; and
(b) updating the device configuration setting of the multi-function device based on the device configuration data obtained in (a).

16. The method as claimed in claim 14, further comprising:
automatically obtaining device configuration data through a network and updating the device configuration setting of the multi-function device based on the device configuration data obtained through the network, if the current device configuration setting of the multi-function device fails the security audit policy.

17. The method as claimed in claim 14, further comprising:
comparing the updated device configuration setting to said security audit policy; and
if a result of the comparison indicates the updated device configuration setting passes said security audit policy, resuming the operation of said multi-function device.

18. The method as claimed in claim 14, further comprising:
displaying a warning message that the multi-function device failed the security audit policy on a user interface of the multi-function device, if the current device configuration setting of the multi-function device fails the security audit policy.

19. The method as claimed in claim 14, further comprising:
obtaining, from an external source, update data for updating said security audit policy;
validating said update data; and
updating said security audit policy based on the validated update data.

20. A security audit system for a multi-function device, said security audit system comprising:
a storage part configured to store a security audit policy;

a security audit part configured to perform a security audit based on the security audit policy, said security audit including comparing (i) a current device configuration setting of said multi-function device corresponding to current operating settings of the device with (ii) said security audit policy; and an update part configured to update the device configuration setting of the multi-function device and thereby change the current operating settings of the device, based on the result of the comparison by said security audit part, wherein in a case that a result of the comparison by the security audit part indicates failure of the security audit policy by the current device configuration setting of the multi-function device, the security audit part automatically halts operation of said multi-function device, and the update part automatically updates the device configuration setting of the multi-function device such that the multi-function device operates and subsequently resuming the operation of said multi-function device under the updated device configuration setting after successful comparison with said security audit policy.

* * * * *